(12) United States Patent
Selenius

(10) Patent No.: US 8,591,100 B2
(45) Date of Patent: Nov. 26, 2013

(54) MIXER ASSEMBLY FOR DIGESTION TANK, HAVING A LEAD THROUGH COMPRISING AT LEAST THREE POSITIONING MEMBERS ARRANGED TO DETERMINE THE MUTUAL POSITION OF A FIRST AND A SECOND ELEMENT OF THE LEAD THROUGH

(75) Inventor: Per Selenius, Taby (SE)

(73) Assignee: Xylem IP Holdings LLC, White Plains, NY (US)

( * ) Notice: Subject to any disclaimer, the term of this patent is extended or adjusted under 35 U.S.C. 154(b) by 0 days.

(21) Appl. No.: 13/643,255

(22) PCT Filed: Mar. 24, 2011

(86) PCT No.: PCT/SE2011/050334
§ 371 (c)(1),
(2), (4) Date: Oct. 24, 2012

(87) PCT Pub. No.: WO2011/136715
PCT Pub. Date: Nov. 3, 2011

(65) Prior Publication Data
US 2013/0051906 A1 Feb. 28, 2013

(30) Foreign Application Priority Data
Apr. 26, 2010 (SE) .................................. 1050408

(51) Int. Cl.
*B01F 15/00* (2006.01)
(52) U.S. Cl.
USPC .......................................... 366/285; 366/331
(58) Field of Classification Search
USPC ................. 366/262–265, 270, 285–286, 331; 464/172; 416/174; 403/288
See application file for complete search history.

(56) References Cited

U.S. PATENT DOCUMENTS

| | | | | | |
|---|---|---|---|---|---|
| 2,091,631 | A | * | 8/1937 | Fischer et al. | 210/541 |
| 2,319,821 | A | * | 5/1943 | McLean | 366/286 |
| 2,463,886 | A | * | 3/1949 | Langmyhr | 366/343 |
| 2,627,171 | A | * | 2/1953 | Brumagim | 464/178 |
| 2,647,733 | A | | 8/1953 | Knowles et al. | |
| 2,665,122 | A | * | 1/1954 | Rowland | 366/262 |
| 2,991,983 | A | | 7/1961 | Logan | |
| 3,115,333 | A | * | 12/1963 | Lennon | 366/286 |
| 3,149,888 | A | * | 9/1964 | Lennon | 384/130 |
| 3,606,260 | A | * | 9/1971 | Rubin | 366/330.1 |

(Continued)

FOREIGN PATENT DOCUMENTS

| | | |
|---|---|---|
| DE | 9114750 U1 | 3/1992 |
| DE | 102007003742 A1 | 7/2008 |
| JP | 2009279529 A * | 12/2009 |

*Primary Examiner* — Charles E Cooley
(74) *Attorney, Agent, or Firm* — Browdy and Neimark, PLLC

(57) ABSTRACT

A lead through for fluid tight connection of a mixer assembly to a roof of a fluid housing digestion tank, including a first element presenting a central opening and an axially extending center axis, and a second element presenting a central opening and an axially extending center axis. The extension of the center axis of the second element is adjustable in relation to the extension of the center axis of the first element. The lead through includes a device for making an interface fluid tight located at the interface between the first element and the second element. Positioning members are arranged to determine the mutual positions of the first element and the second element in the axial direction, and some of the positioning members are constituted by mutually independent adjustment members, which are located on the opposite side of the device for making an interface fluid tight.

6 Claims, 4 Drawing Sheets

(56) References Cited

U.S. PATENT DOCUMENTS

| | | | |
|---|---|---|---|
| 4,198,373 A * | 4/1980 | Kropp et al. | 422/49 |
| 4,256,406 A * | 3/1981 | Somerville | 366/279 |
| 4,511,255 A * | 4/1985 | Saucier | 366/138 |
| 4,515,482 A * | 5/1985 | Schadewald | 366/136 |
| 4,702,724 A * | 10/1987 | Vater | 464/172 |
| 4,738,542 A * | 4/1988 | Hung | 366/244 |
| 4,753,534 A * | 6/1988 | Markle | 366/279 |
| 4,813,786 A * | 3/1989 | LeMaster | 366/251 |
| 5,108,715 A * | 4/1992 | Jekat et al. | 422/159 |
| 5,139,667 A * | 8/1992 | Reneau, Jr. | 210/319 |
| 5,368,390 A * | 11/1994 | Gambrill et al. | 366/273 |
| 5,427,450 A * | 6/1995 | Gambrill | 366/168.1 |
| 6,076,958 A * | 6/2000 | Althouse et al. | 366/286 |
| 6,132,080 A * | 10/2000 | Gurth | 366/286 |
| 6,935,771 B2 * | 8/2005 | Engel | 366/331 |
| 7,520,816 B1 * | 4/2009 | Brisk | 464/172 |
| 7,874,719 B2 * | 1/2011 | Markle et al. | 366/273 |
| 2007/0140054 A1 * | 6/2007 | Stocker | 366/331 |
| 2011/0205833 A1 * | 8/2011 | Thuerwaechter | 366/198 |
| 2012/0307587 A1 * | 12/2012 | Hoefken | 366/331 |
| 2013/0044562 A1 * | 2/2013 | Selenius | 366/331 |
| 2013/0051906 A1 * | 2/2013 | Selenius | 403/288 |

\* cited by examiner

MIXER ASSEMBLY FOR DIGESTION TANK, HAVING A LEAD THROUGH COMPRISING AT LEAST THREE POSITIONING MEMBERS ARRANGED TO DETERMINE THE MUTUAL POSITION OF A FIRST AND A SECOND ELEMENT OF THE LEAD THROUGH

TECHNICAL FIELD OF THE INVENTION

The present invention relates in general to a digestion tank for digestion of excrement, but other applications comprising a fluid housing tank and a mixer assembly are directed as well. Furthermore the present invention relates in general to an adjustable fluid tight lead through of a fluid housing tank. In particular the present invention relates to a lead through for fluid tight connection of a mixer assembly to a roof of a fluid housing tank, comprising a first element, which is arranged to be in fluid tight connection with said roof of the fluid housing tank and which presents a central opening and an axially extending centre axis, and a second element, which is arranged to be in fluid tight connection with said mixer assembly and which presents a central opening and an axially extending centre axis, the extension of the centre axis of the second element being adjustable in relation to the extension of the centre axis of the first element.

BACKGROUND OF THE INVENTION AND PRIOR ART

A common type of digestion tank comprises a mixer assembly for agitating the excrements, or mixture of liquid and sludge, which exist in the fluid housing tank. Such applications comprises usually tanks having a depth of 20-25 meters or more and a volume of several thousands of cubic meters, in which excrements, feces, sludge, waste water, or the like is stored and digested in order to extract methane gas and carbon dioxide, for example. The liquid/sludge is kept in movement by agitation in order to not having the sludge to sediment and in order to not causing a dense cake at the surface of the liquid/sludge, and thereto in order to obtain an as homogenous mixture as possible which entail that most possible quantities of various gases may be extracted. It shall be pointed out that other liquids, in industrial applications, may be stored in similar conditions in which agitation takes place at the same time as the process gases are not released to the surrounding air.

Mixer assemblies suitable for use in a digestion tank or the like comprises a motor and a gear box that lowers the rotational speed of the output shaft of the mixer assembly to about 15-30 revolutions per minute. The present invention is directed towards solutions in which the motor and the gear box of the mixer assembly are located above the roof of the fluid housing tank, and in which the output shaft of the mixer assembly is lead into the fluid housing tank via a lead through and thereafter hang down freely straight down into the fluid housing tank without being journalled in the lower end of the output shaft. The output shaft of the mixer assembly, including the propeller units being arranged at different heights of the output shaft, presents a consider-able weight which entail that a great load is applied to or near to the attachment of the output shaft to the gear box and/or at other connections.

In connection with or after some time after the fluid housing tank is erected and/or is started to be used a settlement and/or inclination of the tank takes place as a rule, which entail that the motor and the gear box are inclined in relation to a plumbline. Due to the fact that the length of the output shaft usually is for instance 20 meters problem arises already at an inclination of tenths of a degree. If the mixer assembly is used without having the inclination corrected the output shaft will bend during rotation, which for instance may lead to fatigue of the output shaft that will break and/or lead to that other parts of the mixer assembly and the fluid housing tank will break.

Thus, the angular position of the mixer assembly in relation to the roof of the fluid housing tank must be adjustable. Known solutions comprises a lead through which in its turn comprises two interacting wedge shaped discs, which discs are arranged to be connected to the roof of the fluid housing tank and the mixer assembly, respectively. The wedge shaped discs presents central openings for passing through of the output shaft of the mixer assembly and are furthermore turn-ably arranged in relation to each other in order to be able to adjust the angular position of the mixer assembly in relation to the fluid housing tank. However, a large problem of this known solution is that the wedge shaped discs may not be rotated in relation to each other when the weight of the mixer assembly rests on them, instead the mixer assembly most be lifted by a crane in order to uncover the lead through and in connection therewith gases will flow out which is harmful for the environment as well as for the maintenance staff.

OBJECT OF THE INVENTION

The present invention aims at obviating above-mentioned drawbacks and disadvantages of previously known lead through arrangements and at providing an improved lead through. A primary object of the invention is to provide an improved lead through of the initially defined type, which secures that gas does not flow out in connection with an adjustment of the angular displacement of the mixer assembly in relation to a plumb line.

Yet another object of the present invention is to provide an improved lead through, which is easily adjusted by one person without any need of auxiliary equipment such as cranes and the like.

SUMMARY OF THE INVENTION

According to the invention at least the primary object is attained by means of the initially defined lead through, which is characterized in that the lead through comprises a means for making an interface fluid tight located at the interface between the first element and the second element, at least three positioning members being arranged to determine the mutual positions of the first element and the second element in the axial direction, at least two of said positioning members being constituted by mutually independ-ent adjustment members, which in relation to said fluid housing tank are located on the opposite side of said means for making an interface fluid tight.

Preferably the first element and the second element are telescopically arranged in the axial direction in relation to each other, and according to a yet preferred embodiment the means for making an interface fluid tight comprises at least one circumferentially extending sealing ring, which abuts an inner surface of the first element and an outer surface of the second element. This entail a simple and secure fluid sealing that admit a large angular displacement of the mixer assembly in relation to the fluid housing tank.

According to a preferred embodiment each adjustment means comprises a first wedge element, a second wedge element interacting with said first wedge element and adjustment means, which adjustment means is maneuverable in order to increase and decrease the axial height of the adjustment means, respectively. Such a design entail that the angular displacement of the mixer assembly in relation to the fluid housing tank may be adjusted without having to lift the mixer assembly away from the lead through.

Preferably the adjustment means comprises a first screw maneuverable to increase the axial height of the adjustment means, and a second screw maneuverable to decrease the axial height of the adjustment means.

Further advantages with and features of the invention are evident from the following detailed description of preferred embodiments.

BRIEF DESCRIPTION OF THE DRAWINGS

A more complete understanding of abovementioned and other features and advantages of the present invention will be apparent from the following detailed description of preferred embodiments with reference to the appended drawings, in which.

DETAILED DESCRIPTION OF PREFERRED EMBODIMENTS

Figure 1:
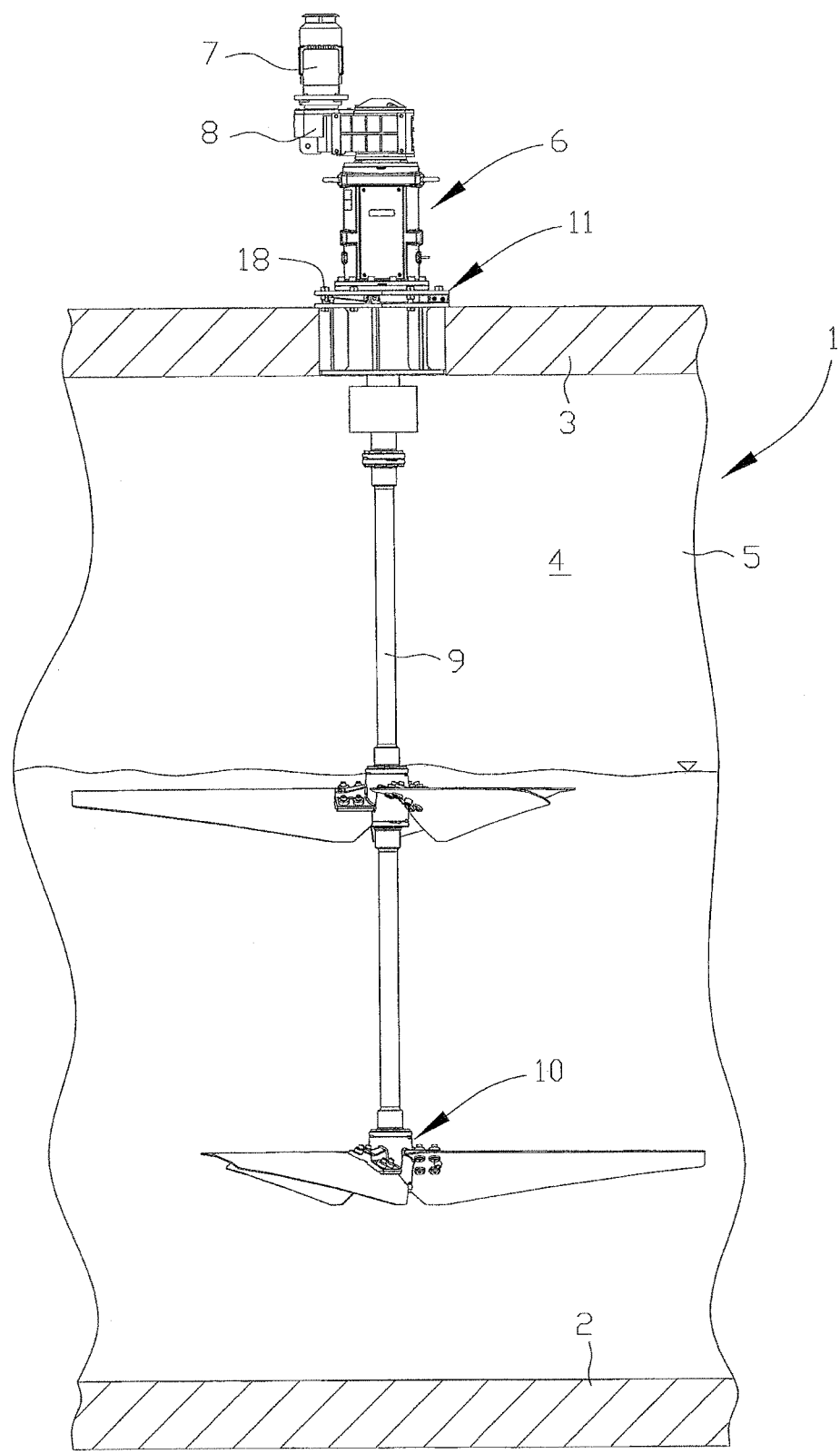
FIG. 1 is a schematic side view of an intersected fluid housing tank and a mixer assembly comprising the inventive lead through, FIG. 2 is a perspective view of the inventive lead through, FIG. 3 is a side view of a lead through according to FIG. 2.

The present invention relates in general to a plant for digestion of excrements. In FIG. 1 is shown a part of a fluid housing tank, digestion tank or tank, generally designated 1, comprising a floor 2, a roof 3 and a circum-ferential wall shell 4, which together enclose a volume 5 for housing excrements, feces, sludge, waste water, or the like, that shall be stored and digested in order to extract methane gas and carbon dioxide among other things.

Furthermore a mixer assembly, generally designated 6, is shown in FIG. 1 comprising a drive unit having a motor 7 and a gear box 8 and an output shaft 9 extending from the drive unit and being freely suspended from the drive unit. Thereto at least a propeller unit 10 is connected to the output shaft 9 whereupon the output shaft 9 and the propeller unit 10 are arranged to be driven in rotation about a plumb line. Preferably two or more propeller units 10 are connected to the output shaft 9.

In the embodiment shown in FIG. 1 the mixer assembly 6 comprises two propeller units 10, a lower propeller unit arranged in connection with the free lower end of the output shaft 9 and an upper propeller unit arranged at a suitable position between the lower propeller unit and the drive unit. Preferably the lower propeller unit is located at a height in the fluid housing tank 1 located in the lower half of the contained fluid volume, and preferably the upper propeller unit is located at a height in the fluid housing tank 1 located in the area of the surface of the contained fluid. The main object of the lower propeller unit is to cause agitation, and the main object of the upper propeller unit is to break the cake of solid material that is formed at the surface of the contained surface in such applica-tions.

Thereto an inventive lead through, generally designated 11, is shown in FIG. 1, which is arranged to provide a fluid tight connection between the mixer assembly 6 and the roof 5 of the fluid housing tank 1.

Figure 2:
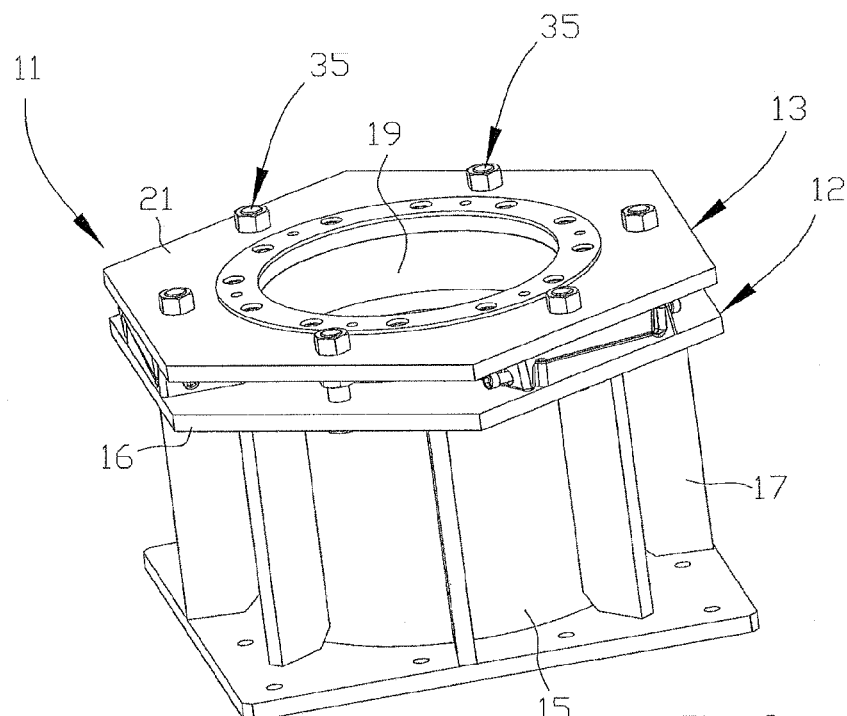
Figure 3:
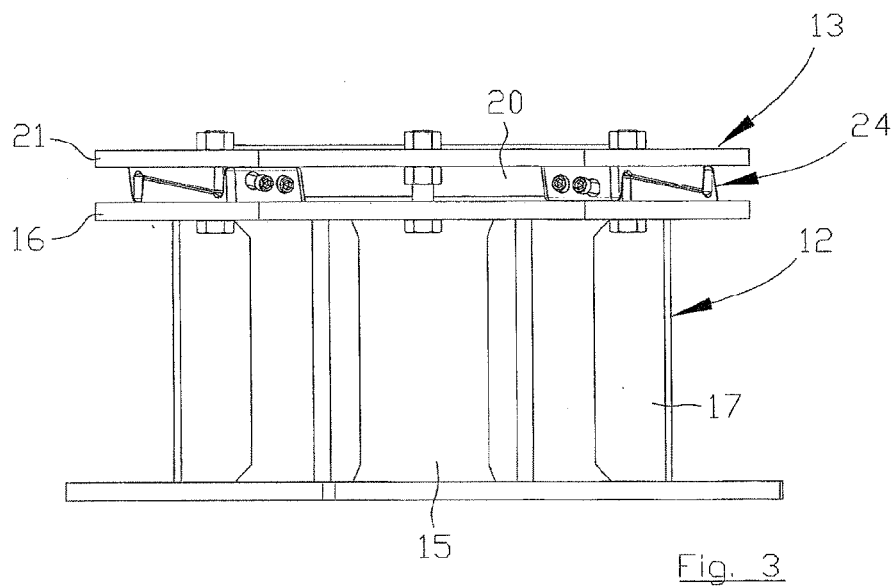
Figure 4:
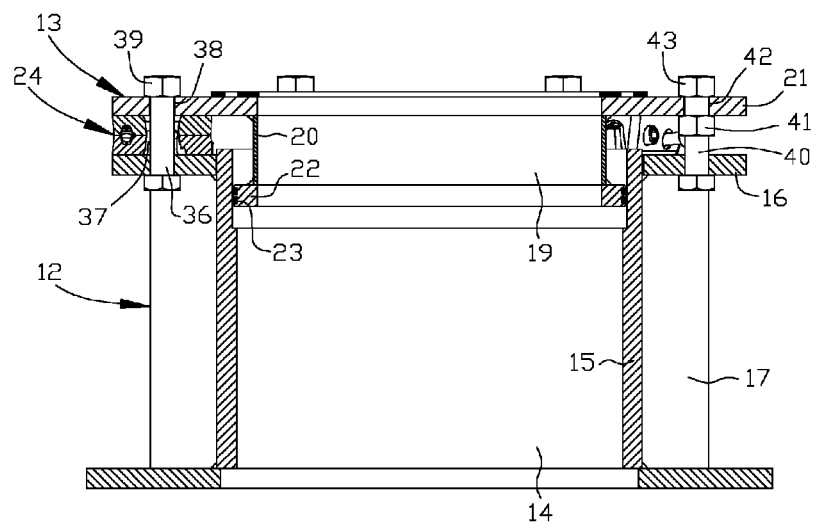
FIG. 4 is a cross section side view of the lead through according to FIG. 2.
Figure 5:
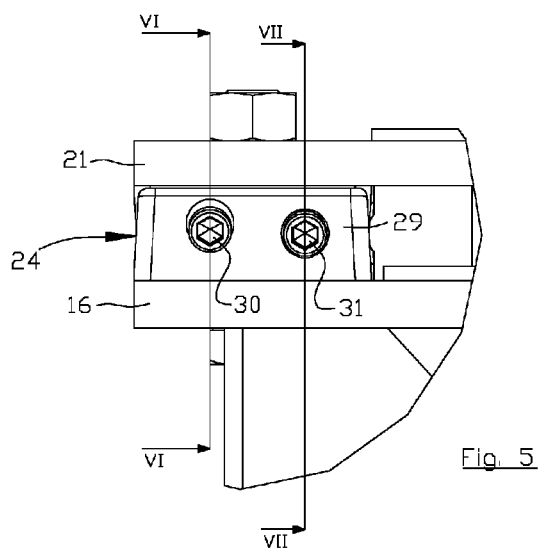
FIG. 5 is an enlarged side view of a part of the lead through showing the positions of the cross sections.
Figure 6:
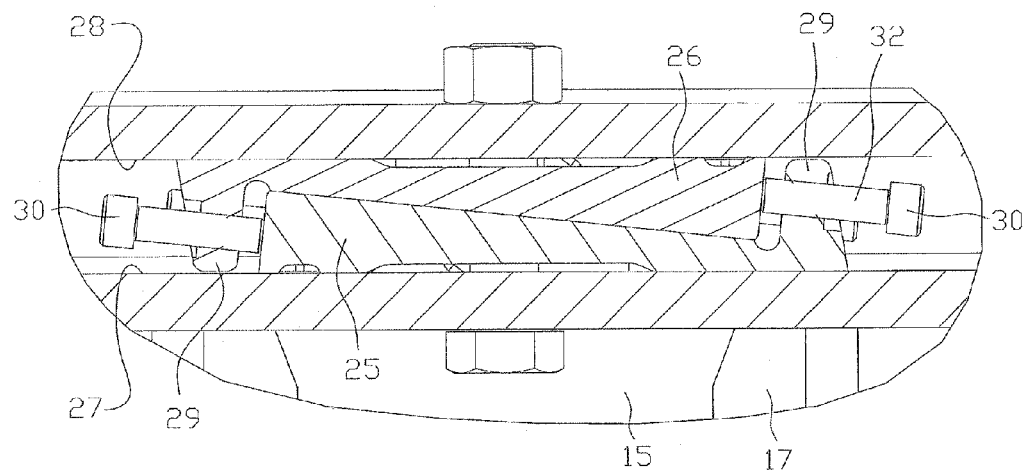
FIG. 6 is an enlarged side view taken along the line VI in FIG. 5.
Figure 7:
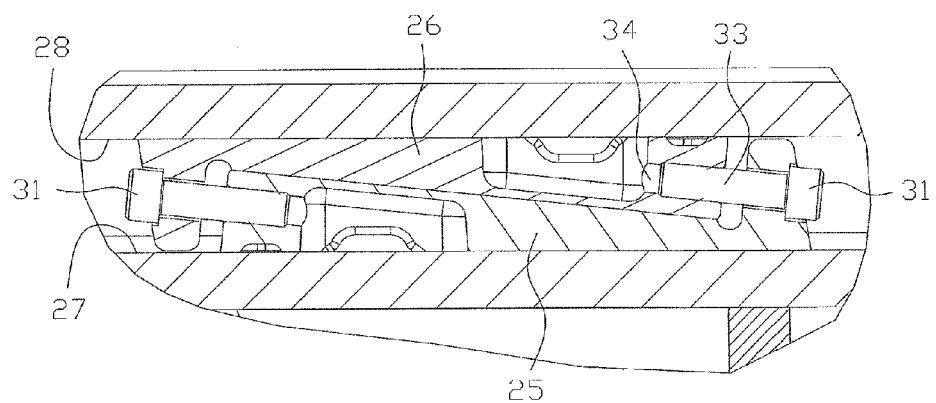
FIG. 7 is an enlarged side view taken along the line VII in FIG. 5.

Reference is now made to FIGS. 2, 3 and 4, in which a preferred embodiment of the present invention is shown. The lead through 11 comprises a first element 12 arranged to be connected to the roof 3 in a fluid tight manner, and a second element 13 arranged to be connected to the mixer assembly 6 in a fluid tight manner.

The first element 12 may be firmly and releasably connected to the roof 3, for instance the first element 12 may be embedded in the roof 3. The first element 12 presents a central opening 14 and an axially extending centre axis, the output shaft 9 of the mixer assembly 6 extending down through the central opening 14. In the shown embodiment the first element 12 comprises an axially extending tube shaped body 15 and a radially extending upper flange 16 extending from the tube shaped body 15, which upper flange is connected to the tube shaped body 15 in the area of the upper end of the tube shaped body 15. Thereto the first element 12 comprises a number of stiffeners 17 assisting in supporting said upper flange 16, and preventing rotation of the lead through when it is embedded into the roof of the fluid housing tank. The lead through may as well be screwed onto the roof of the fluid housing tank when possible.

The second element 13 may be fixedly or releasably connected to the mixer assembly 6, for instance the mixer assembly 6 may be connected to the second element 13 by means of several bolts 18 (see FIG. 1). The second element 13 presents a central opening 19 and an axially extending centre axis, the output shaft 9 of the mixer assembly 6 extending down through the central opening 19. In the shown embodiment the second element 13 comprises an axially extending tube shaped body 20 and a radially extending upper flange 21 extending from the tube shaped body 20, which upper flange is connected to the tube shaped body 20 in the area of the upper end of the tube shaped body 20. Thereto the second element 13 comprises a radially extending lower flange 22 extending from said tube shaped body 20. It shall be pointed out that the tube shaped body 20 of the second element 13 in an alternative embodiment (not shown) is constituted by a flexible tube shaped body, the lower end of which may be connected to a lower flange 22 or be directly connected to the upper flange 16 of the first element 12 or the tube shaped body 15.

An essential feature of the inventive lead through 11 is that the extension of the centre axis of the second element 13 is adjustable in relation to the extension of the centre axis of the first element, i.e. that the centre axis of the first element 12 and the centre axis of the second element 13 may be positioned in mutually different angles in relation to a plumb line.

Thereto it is preferred that the first element 12 and the second element 13 are telescopically arranged in relation to each other in the axial direction, i.e. that at least a part of one of the elements of the first element 12 and the second element 13 shall be located in the central opening of the first element 12 and of the second element 13. In the shown embodiment at least the lower flange 22 of the second element 13 is located in the central opening 14 of the first element 12. In an alternative embodiment (not shown) the tube shaped body 15 of the first element 12 may extend upwards from the upper flange 16 of the first element 12 and into the central opening 19 of the second element 13, which presuppose that at least the upper part of the tube shaped body 15 of the first element 12 has smaller diameter than the tube shaped body 20 of the second element 13.

According to the invention the lead through 11 comprises a means for making an interface fluid tight located at the interface between the first element 12 and the second element 13. The means for making an interface fluid tight shall admit that the extension of the centre axis of the first element 12 and the extension of the centre axis of the second element 13 are adjustable in relation to each other.

In the preferred shown embodiment the means for making an interface fluid tight is constituted by at least a circumferential sealing ring 23, which abuts the inner surface of the first element 12 and an outer surface of the second element 13. More precisely the at least one circum-ferentially extending sealing ring 23 is arranged between the outer surface of the lower flange 22 of the second element 13 and an inner surface of the tube shaped body 15 of the first element 21. In an alternative embodiment (not shown) the means for making an interface fluid tight is constituted by a circumferentially extending fluid seal. In the case the tube shaped body 20 of the second element 13 is flexible, as described above, the means for making an interface fluid tight is constituted by the flexible tube shaped body 20 when the tube shaped body 20 is directly connected to the first element 12.

Reference is now primarily made to FIGS. 4-7. According to the invention the lead through 11 comprises at least three positioning members arranged to determine the mutual position of the first element 12 and the second element 13 in the axial direction, at least two of the positioning members being constituted by mutually independ-ent adjustment members, each generally designated 24, which in relation to said fluid housing tank 1 are located at the opposite side of said means for making an interface fluid tight. In fact this entail that the adjustment members are located radially outside said means for making an interface fluid tight. According to a preferred embodiment the third of the abovementioned positioning members is constituted by such an adjustment member 24 as well. Said three positioning members are equidistantly distributed about the centre axis of the first element 12 and the second element 13.

Each adjustment member 24 comprises preferably a first wedge element 25, a second wedge element 26 interacting with/abutting said first wedge element 25 and adjustment means, which adjustment means is maneuverable in order to increase and decrease the axial height of the adjustment member 24, respectively. According to the shown embodiment the first wedge element 25 abuts an upwardly facing surface 27 of the first element 12, and the second wedge element 26 abuts a downwardly facing surface 28 of the second element 13. At least one of the first wedge element 25 and the second wedge element 26 comprises at its narrow end a gable 29 erected from said narrow end, the adjustment means being arranged to act between said erected gable 29 and the thick end of the other wedge element of the first wedge element 25 and the second wedge element 26. The first wedge element 25 and the second wedge element 26 have wedge angles that preferably are smaller than 10 degrees, and more preferably about 6 degrees. Preferably the first wedge element 25 and the second wedge element 26 are uniform, both of the first wedge element 25 and the second wedge element 26 comprising a gable 29 erected at the narrow end of each wedge element. Preferably the adjustment means comprises a first screw 30 maneuverable to increase the axial height of the adjustment means 24, and a second screw 31 maneuverable to decrease the axial height of the adjustment means 24.

The first screw 30 comprises a shaft 32 having an external thread which is in threaded engagement with an internal thread of a through hole in the erected gable 29 of one of the wedge elements, at the same time as the free end of the shaft 32 abut the thick end of other wedge element. Preferably the shaft 32 of the first screw 30 is arranged in parallel with the abutment plane between the first wedge element 25 and the second wedge element 26. In connection with screwing in of the first screw 30 the axial height of the adjustment member 24 will increase. The second screw 31 comprises a shaft 33 having an external thread, the shaft 33 runs freely through a through hole in the erected gable 29 of one of the wedge elements and is in threaded engagement with a threaded hole 34, which mouth in the thick end of other wedge element. Preferably the shaft 33 of the second screw 31 is arranged in parallel with the abutment plane between the first wedge element 25 and the second wedge element 26. In connection with screwing in of the second screw 31 the axial height of the adjustment means 24 will decrease. It shall be realized that in order to increase the height of the adjustment means 24, before the first screw 30 is screwed in a certain length the second screw 31 must be screwed out correspondingly, and in order to decrease the height of the adjustment means 24, before the second screw 31 is screwed in a certain length the first screw 30 must be screwed out correspondingly. When the intended height of the adjustment means 24 is obtained also the, at the moment, inactive screw is screwed in, in order to lock the obtained height of the adjustment means.

In one embodiment both the first screw 30 and the second screw 31 are in threaded engagement with the same wedge element. In an alternative embodiment both the first screw 30 and the second screw 31 are arranged next to each other in the same erected gable. However, the preferred and shown embodiment is a combination of abovementioned embodiments wherein a first screw 30 and a second screw 31 are in threaded engagement with each of the first wedge element 25 and the second wedge element 26.

Thereto, the lead through 11 ought to comprise a number of locking element 35, arranged to prevent the second ele-ment 13 from being displaced upwardly in the axial direction in relation to the first element 12 after the adjustment members 24 have been set in such a way that the centre axis of the second element 13 and the output shaft 9 are verti-cal. In the shown embodiment two types of locking elements 35 are provided, a first type directly interacting with the adjustment members 24 and a second type which is separated from the adjustment members 24. The first type and the second type of locking element 35 may be used together or separately in one and the same lead through 11.

The first type of locking element 35 clamps the adjust-ment member 24 between the upwardly facing surface 27 of the first element and the downwardly facing surface 28 of the second element 13. The first type of locking element 35 comprises in the preferred embodiment an at least partly externally threaded rod 36 (see FIG. 4) that is connected to the upper flange 16 of the first element 12 and that extends through an axially extending hole 37 in the adjust-ment member 24 and further through a hole 38 in the upper flange 21 of the second element 13. Finally a nut 39 is arranged on and is in threaded engagement with the rod 36, and upon tightening of the nut 39 the mutual position of the first element 12 and the second element 13 in the axial direction is locked. The rod 36 thereto helps to preposition the adjustment member 24 due to the fact that it extends through the hole 37 of the adjustment member 24, which hole 37 is oblong in the longitudinal direction of the first wedge element 25 and of the second wedge element 26 in order to admit mutual displacement between the first wedge element 25 and the second wedge element 26. It shall be realized that the nut 39 most be loosened before the height of the adjustment member 24 may be increased.

The second type of locking element 35 as well locks the mutual position of the first element 12 and the second element 13, but is separated from the adjustment members 24. The second type of locking element 35 comprises in the preferred embodiment an at least partly externally threaded rod 40 (see FIG. 4) that is connected to the upper flange 16 of the first element 12. A lower nut 41 is in threaded engagement with the rod 40, whereupon the rod 40 extends through a hole 42 in the upper flange 21 of the second element 13. The lower nut 41 is brought in abutment with the lower side of the upper flange 21 of the second element 13, and finally an upper nut 43 is arranged on and is in threaded engagement with the rod 40 and upon tightening of the upper nut 43 the mutual position of the first element 12 and the second element 13 in the axial direction is locked. It shall be realized that the lower nut 41 and/or the upper nut 43 most be loosened before the height of the adjustment members 24 may be decreased and increased, respectively.

It shall be pointed out that the third of abovemen-tioned at least three positioning members may be constituted by a locking element 35 of the described second type. According to alternative embodiment (not shown) the third positioning member may be constituted by a locking element 35 of a third type in which the adjustment member 24 is replaced by a spacing sleeve arranged between the upwardly facing surface 27 of the first element and the downwardly facing surface 28 of the second element 13.

Feasible Modifications of the Present Invention

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and the equivalents thereof. Thus, the equipment may be modified in all kinds of ways within the scope of the appended claims.

It shall also be pointed out that all information about/concerning terms such as upper, lower, etc., shall be interpreted/read having the equipment oriented according to the figures, having the drawings oriented such that the references can be properly read. Thus, such terms only indicates mutual relations in the shown embodiments, which relations may be changed if the inventive equipment is provided with another structure/design.

It shall also be pointed out that even thus it is not explicitly stated that features from a specific embodiment may be combined with features from another embodiment, the combination shall be considered obvious, if the combination is possible.

The invention claimed is:

1. Lead through for fluid tight connection of a mixer assembly to a roof of a fluid housing tank, comprising a first element, which is arranged to be in fluid tight connection with said roof of the fluid housing tank and which presents a central opening and an axially extending centre axis, and a second element, which is arranged to be in fluid tight connection with said mixer assembly and which presents a central opening and an axially extending centre axis, the extension of the centre axis of the second element forming an angle with the extension of the centre axis of the first element and the angle being adjustable, wherein the lead through comprises a means for making an interface fluid tight located at the interface between the first element and the second element, at least three positioning members being arranged to determine the mutual positions of the first element and the second element in the axial direction, at least two of said positioning members being constituted by mutually independent adjustment members, and said means for making an interface fluid tight are disposed between said fluid housing tank and said mutually independent adjustment members.

2. Lead through according to claim 1, wherein the first element and the second element are telescopically arranged in relation to each other in the axial direction.

3. Lead through according to claim 2, wherein the means for making an interface fluid tight comprises at least one circumferentially extending sealing ring, which abuts an inner surface of the first element and an outer surface of the second element.

4. Lead through according to claim 1, wherein each adjustment member comprises a first wedge element, a second wedge element cooperating with said first wedge element and adjustment means, which adjustment means is maneuverable in order to increase and decrease, respectively, the axial height of the adjustment member.

5. Lead through according to claim 4, wherein the first wedge element abuts an upwardly facing surface of the first element, and the second wedge element abuts a downwardly facing surface of the second element.

6. Lead through according to claim 4, wherein the adjustment means comprises a first screw maneuverable in order to increase the axial height of the adjustment member, and a second screw maneuverable in order to decrease the axial height of the adjustment member.

\* \* \* \* \*